(12) United States Patent
Rannu et al.

(10) Patent No.: US 9,183,550 B2
(45) Date of Patent: Nov. 10, 2015

(54) SYSTEM AND METHOD TO FACILITATE PURCHASES ON MOBILE DEVICES

(71) Applicant: Fortumo OÜ, Tartu (EE)

(72) Inventors: Rain Rannu, Tartu (EE); Tauno Talimaa, Tartu (EE); Andrei Dementjev, Tartu (EE); Madis Pink, Tartu (EE); Tanel Kosk, Tartu (EE)

(73) Assignee: FORTUMO OÜ, Tartu (EE)

( * ) Notice: Subject to any disclaimer, the term of this patent is extended or adjusted under 35 U.S.C. 154(b) by 150 days.

(21) Appl. No.: 13/686,253

(22) Filed: Nov. 27, 2012

(65) Prior Publication Data

US 2013/0138558 A1 May 30, 2013

Related U.S. Application Data

(60) Provisional application No. 61/563,789, filed on Nov. 27, 2011, provisional application No. 61/563,792, filed on Nov. 27, 2011.

(51) Int. Cl.
| | |
|---|---|
| *G06Q 20/32* | (2012.01) |
| *G06Q 20/12* | (2012.01) |
| *G06Q 20/16* | (2012.01) |
| *H04W 4/00* | (2009.01) |

(52) U.S. Cl.
CPC ............ *G06Q 20/322* (2013.01); *G06Q 20/123* (2013.01); *G06Q 20/16* (2013.01); *G06Q 20/3255* (2013.01); *H04W 4/00* (2013.01)

(58) Field of Classification Search
CPC ......... G06Q 20/32; H04W 4/24; H04W 12/06
See application file for complete search history.

(56) References Cited

U.S. PATENT DOCUMENTS

| | | | | |
|---|---|---|---|---|
| 7,299,037 | B2 * | 11/2007 | Hospes | 455/419 |
| 7,693,506 | B1 * | 4/2010 | Back et al. | 455/432.1 |
| 2002/0112052 | A1 * | 8/2002 | Brittingham et al. | 709/224 |
| 2011/0047594 | A1 * | 2/2011 | Mahaffey et al. | 726/1 |
| 2011/0106709 | A1 * | 5/2011 | Puura et al. | 705/64 |
| 2011/0119155 | A1 * | 5/2011 | Hammad et al. | 705/26.41 |
| 2011/0125610 | A1 * | 5/2011 | Goodsall et al. | 705/27.1 |

* cited by examiner

*Primary Examiner* — Vladimir Magloire
*Assistant Examiner* — Ernest Tacsik
(74) *Attorney, Agent, or Firm* — Birch, Stewart, Kolasch & Birch, LLP

(57) ABSTRACT

System and method to enable and facilitate purchases through mobile communications on mobile devices, smartphones, feature phones, tablet computers, etc by allowing the user to interact with native interface and/or by eliminating the need of entering the MSISDN identifier by the user. MSISDN value is required to identify mobile subscriber and request a mobile billing transaction through carrier's infrastructure. A system comprises at least one data computing facility, which is connected to mobile carrier billing, short code and networking infrastructure and a plurality of converters to communicate and interface with a plurality of controllers for various mobile device types and platforms.

6 Claims, 7 Drawing Sheets

SYSTEM AND METHOD TO FACILITATE PURCHASES ON MOBILE DEVICES

CROSS REFERENCE TO RELATED APPLICATIONS

This nonprovisional application claims the benefit under 35 U.S.C. §119(e) of U.S. Provisional Application Nos. 61/563,789 filed on Nov. 27, 2011 and 61/563,792 filed on Nov. 27, 2011. The entire content of all of the above applications is hereby incorporated by reference.

FIELD OF INVENTION

The present invention relates to the field of mobile payments, more specifically to facilitating purchases of goods and services on mobile devices via cross-platform user interface and/or by automatic Mobile Network Code, Mobile Country Code and MSISDN detection.

BACKGROUND OF THE INVENTION

It is known to perform purchases of goods or services using a mobile device. For example, a user may purchase a song while browsing a mobile website. Or pay for additional content inside mobile game or application. There are various methods and technologies, which allow a user to perform purchases on a mobile device, including but not limited to those provided by mobile operating system manufacturer, handset vendors, mobile carriers and banks.

Every mobile platform and operating system has a distinctive user interface—a unique set of visual elements and guidelines often called native user interface. Applications that follow respective platform's user interface guidelines benefit from being easier and more convenient for the user. The same applies for purchasing methods. On the other hand sellers are interested in minimizing the number of variations in purchasing options and methods thus lowering operational costs.

What is needed is a method and system, that benefits from utilizing native and universal user interface while not being tied to a single mobile platform or operating system, thus enabling a native interface for various platforms via a single integration for the seller.

From the user perspective instead of a single purchase flow for all mobile devices, that includes multiple steps and a lot of user input, a native platform specific user experience and interface is used. As a result, the process of purchase on mobile device feels like an initial and built-in functionality of the handset provided by mobile operator.

From another user perspective the time-consuming step of phone number (MSISDN) input is excluded from the purchase flow. The whole payment process is more smooth and effective without the risk of input errors. As a result, the purchase process is completed in fewer steps

BRIEF DESCRIPTION OF THE INVENTION

The aim of present invention is to provide a solution for purchases on mobile devices using cross mobile platform native user interface technology and solution to facilitate purchases on mobile devices by automatic Mobile Network Code, Mobile Country Code and MSISDN detection for in-application payments without knowing the phone number of the user.

The system and method according to present invention is used to enable and facilitate purchases through mobile communications on mobile devices including but not limited to smartphones, feature phones and tablet computers by allowing the purchaser to interact with native interface and/or by eliminating the need of entering the MSISDN identifier by the purchaser.

A system comprises at least one data computing facility (DCF), which is connected to mobile carrier billing infrastructure, short code and networking infrastructure and a plurality of converters to communicate and interface with a plurality of controllers for various types of mobile devices and platforms.

The advantage of the present invention from the user perspective is that instead of a single purchase flow for all mobile devices, that includes multiple steps and a lot of user input, a native platform specific user experience and interface is used or the time-consuming step of MSISDN input is excluded from the purchase flow. The whole payment process is more smooth and effective without the risk of input errors. As a result, the process of purchase on mobile device it feels like an initial and built-in functionality of the handset provided by mobile operator.

The advantage of the present invention from the merchant perspective is that purchases can be enabled for several mobile device platforms using a single solution and a single integration, while still providing a native interface and purchase flow. This allows minimizing the number of variations in purchasing options and methods thus lowering operational costs.

In a first embodiment a system and method for cross-platform purchases on mobile devices comprises at least one data computing facility, which is connected to mobile carrier billing infrastructure and at least one converter to communicate and interface with at least one of controllers for various types of mobile devices and platforms. Respective controller integrates with mobile device native input and output interface in order to obtain user's identification details (for example MCC, MNC, MSISDN), inform the user about upcoming transaction cost and associated merchant details (for example name, contacts and/or other information about service provider) and confirm the purchase through respective payment confirmation screen. Once confirmed, purchase confirmation and user's identification details are communicated by respective controller to respective converter, that forwards transaction details (for example the recipient, the sum of transaction, confirmation, etc) to mobile carrier billing infrastructure through data computing facility. Once transaction is confirmed by carrier's infrastructure, respective converter transmits purchase confirmation details to respective controller on user's device. Transaction confirmation is later communicated to user through platform's native interface.

In a first embodiment a respective controller integrates with platform's native interface in order to obtain user's identification details, inform the user about upcoming transaction cost and associated merchant details and confirm the purchase through respective payment confirmation opt-in screen, provided by the platform's interface. When the purchase is once confirmed, the purchase confirmation and user's identification details are communicated by respective controller to respective converter that forwards transaction details to mobile carrier billing infrastructure through computing facility.

When the transaction is confirmed by carrier's infrastructure, the respective converter transmits purchase confirmation details to respective controller on user's device. A transaction confirmation is later communicated to user through platform's native interface.

In a second embodiments system and method for facilitating purchases on mobile devices by automatic Mobile Network Code, Mobile Country Code and Mobile Subscriber ISDN (MSISDN) detection comprises at least one data computing facility, which is connected to mobile carrier billing infrastructure, short code and networking infrastructure and a plurality of converters to communicate and interface with a plurality of controllers for various types of mobile devices and platforms. Respective controller communicates with respective operating system telephony component by using native system functionality and obtains Mobile Network Code (MNC) and Mobile Country Code (MCC) values. If the code values are among the ones currently supported by data computing facility's existing connection to mobile carrier billing infrastructure, a text message to respective short code consisting of encoded device and purchase identification details (for example the recipient, the sum of purchase, confirmation, etc) is initiated and sent by respective controller through operating system's native messaging component. Once the purchase identification details are received by the short code, the message is transported to data computing facility and decoded by respective converter. As a result, MNC, MCC and MSISDN values are obtained and can be used for initiating a transaction through carrier billing infrastructure.

In a second embodiment the MSISDN value is required to identify mobile subscriber and request a mobile billing transaction through carrier's billing infrastructure. Respective controller communicates with respective operating system telephony component by using native system functionality and obtains Mobile Network Code (MNC) and Mobile Country Code (MCC) values. If code values are among the ones currently supported by data computing facility's existing mobile carrier billing connections, a text message to respective short code consisting of encoded device and purchase identification details is initiated and sent by respective controller through operating system's native messaging component. Once received by the short code, message is transported to data computing facility and decoded by respective converter. As a result, MNC, MCC and MSISDN values are obtained and can be used for initiating a transaction through carrier billing infrastructure.

A further development of the present invention is combining and integrating first and second embodiments, system and method for facilitating purchases on mobile devices via a cross-platform native user interface and/or Mobile Network Code, Mobile Country Code and MSISDN detection. The system and method comprises a mobile device component connected to a network and a server component connected to the network and having a database component. Mobile device component is a further development of device controller, connected to device core platform. Server and database components are the further development of data computing facility and remote converters.

Mobile device component comprises a device controller, configured to interface with operating system of the device and detect operating system's type and version; a purchase user interface controller, configured to interface with input and output components of mobile device including but not limited to display, keyboard, speaker, touchscreen.

Server component comprises an interface converter connected with a plurality of native interface controllers.

Database component is configured to store native user interface data including but not limited to visual elements, layouts, stylesheets and animations for different mobile operating systems.

In response to initialization of purchase process by the user, purchase user interface controller connects with device controller and obtains operating system information including name and version. This information is later sent to interface converter on server component. Interface converter connects to respective native interface controller, which matches device's operating system. Native interface controller connects to database component and obtains respective user interface data, which is sent back to interface converter, where the data is converted to common format and sent back to purchase user interface controller for being displayed to the user.

In an alternative embodiment the present invention includes a method of connecting with universal interface controller on server component in case device's operating system is not supported by any of the native user interface controllers. In such case a best suiting universal user interface data in terms of visual elements, size and layout is sent back to interface converter.

In an alternative embodiment the present invention comprises a method of obtaining Mobile Country Code and Mobile Network Code values by the device controller in case such values are provided by operating system of the device. Mobile Country Code and Mobile Network Code values may be further used for identifying the user and facilitating the purchase process.

In an alternative embodiment the present invention comprises a method of obtaining MSISDN value by the device controller in case such value is provided by operating system of the device. MSISDN value may be further used for identifying the user and facilitating the purchase process.

Other features will be apparent from the accompanying drawings and from the detailed description, which follows.

BRIEF DESCRIPTION OF THE DRAWINGS

The present invention is explained more precisely with references to figures added, where.

DETAILED DESCRIPTION OF THE INVENTION

For the purposes of promoting an understanding of the principles of the invention, reference will now be made to a number of illustrative embodiments illustrated in the drawings and specific language will be used to describe the same. The following description and drawings are illustrative and are not to be construed as limiting. Numerous specific details are described to provide a thorough understanding. However, in certain instances, well known or conventional details are not described in order to avoid obscuring the description.

The process of completing a purchase on mobile device consists of several steps and requires user authorization through detecting user's country, mobile carrier and phone number. Part of this information is obtainable directly from mobile device, bypassing the need of requesting this information from user. Country information can be obtained from Mobile Country Code (MCC) and carrier information can be obtained from Mobile Network Code (MNC) values in accordance with E.212 numbering standard by International Telecommunication Union.

Subscriber identification is performed using Mobile Subscriber Integrated Services Digital Network Number (MSISDN) value according to recommendation E.164 of ITU Telecommunication Standardization Sector.

A system according to present invention comprises at least one data computing facility, which is connected to mobile carrier billing infrastructure, short code and networking infrastructure and a plurality of converters to communicate and interface with a plurality of controllers for various mobile device types and platforms.

Each converter is configured to communicate with a respective controller using any of supported wireless communication protocols (for example UMTS, W-CDMA, HSPA, LTE, EDGE, GSM, GPRS, GSM Short Message protocol, IEEE 802.11. etc) Selection of communication interface is performed automatically by interrogating with device's platform core component.

In a first embodiment each controller is designed to integrate with respective device's platform interface. In a second embodiment each controller is designed to interact with respective device's operating system native telephony and messaging component in order to determine MNC and MCC values based on device's operating system.

In case respective controller is not able to integrate with platform's native interface, a universal HTML5 markup language based web interface is used for purchase confirmation. Operating system detection is performed by converter based on user agent property according to RFC 1945. Device and purchase identification details are transmitted using operating system's native messaging component through SMS-PP protocol as a Mobile Originated (MO) short message service transfer. Mobile subscriber identification is performed by using Mobile Subscriber Integrated Services Digital Network Number (MSISDN) value according to ITU-T specification E.164. MSISDN value is obtained from Mobile Originated short message service transfer by short code gateway.

Figure 1:
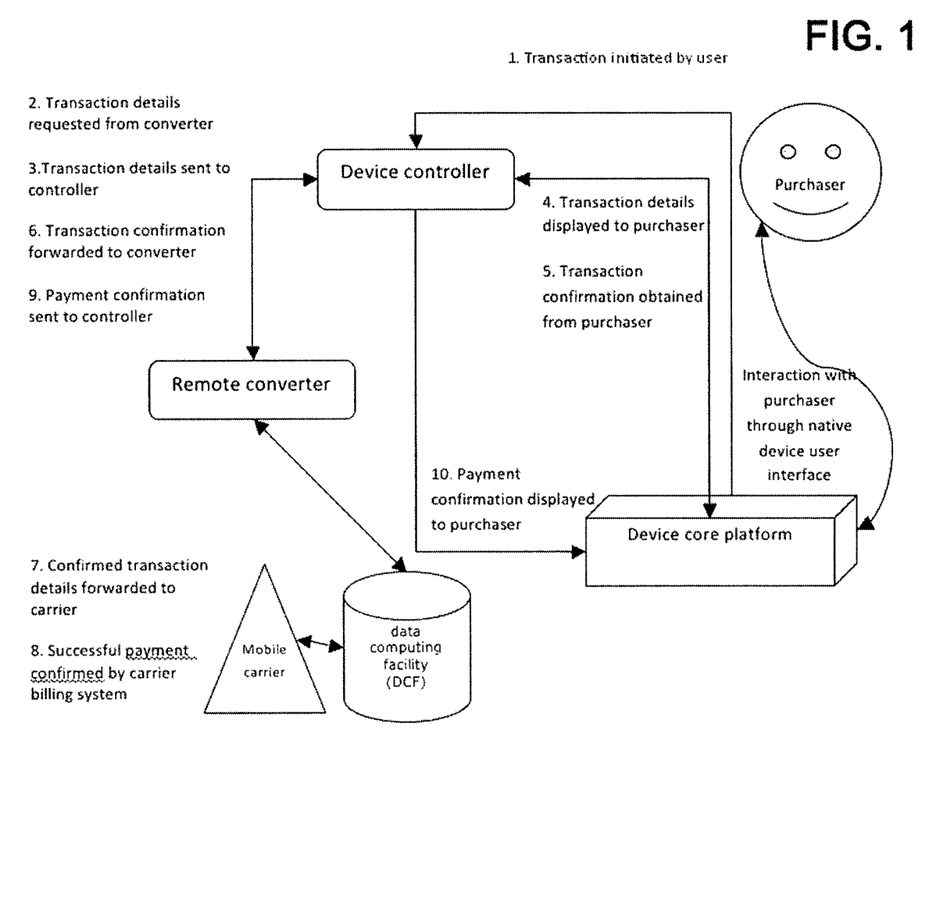
FIG. 1 depicts an illustrative system for cross-platform purchases on mobile devices according to the first embodiment.

FIG. 1 shows a system to enable and simplify cross-platform purchases on mobile devices. In FIG. 1, a system consists of at least one data computing facility, which is connected to mobile carrier billing infrastructure and a plurality of converters to communicate and interface with a plurality of controllers for various mobile device types and platforms.

Figure 2:
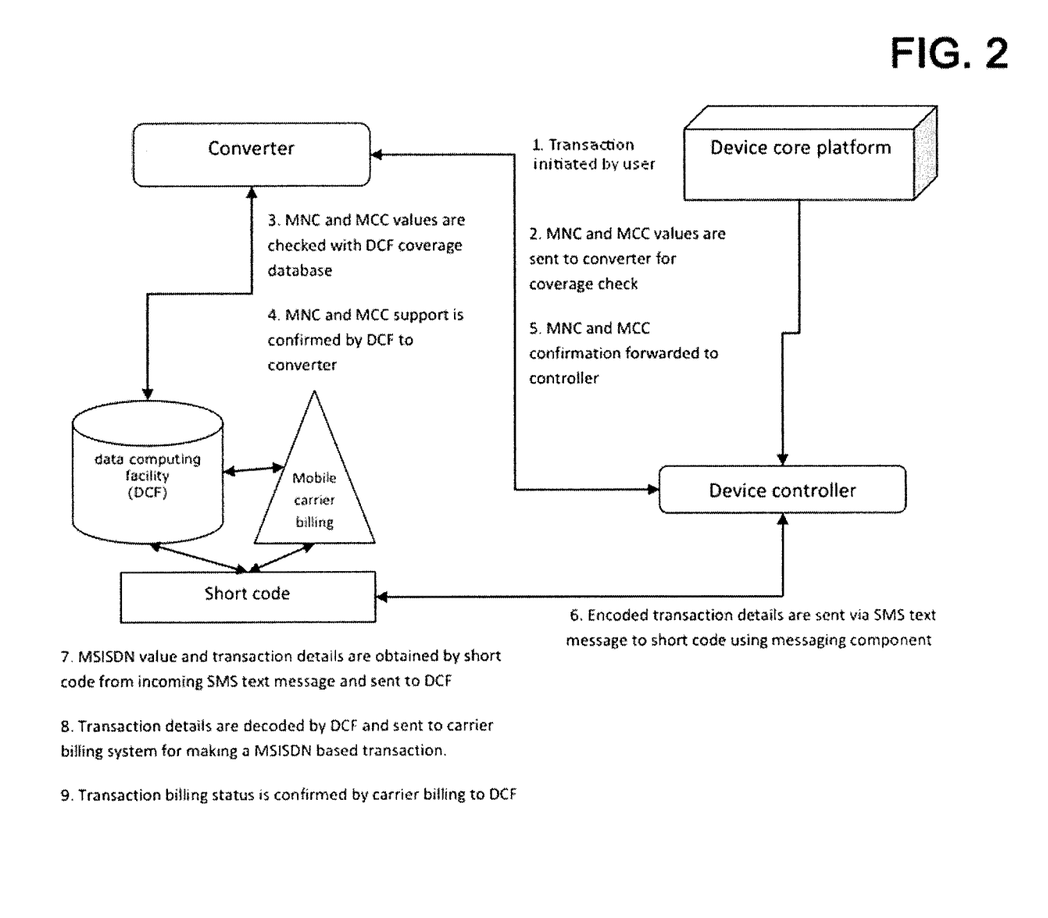
FIG. 2 depicts an illustrative system for facilitating purchases on mobile devices by automatic Mobile Network Code, Mobile Country Code and MSISDN detection according to the second embodiment.

In FIG. 1 a method to facilitate purchases on mobile devices in a first embodiment via cross-platform native user interface comprises following steps (Interaction with user through native device user interface):

1. Transaction initiated by user
2. Transaction details requested from converter
3. Transaction details sent to controller
4. Transaction details displayed to user
5. Transaction confirmation obtained from user
6. Transaction confirmation forwarded to converter
7. Confirmation transaction details forwarded to carrier
8. Successful payment confirmed by carrier billing system
9. Payment confirmation sent to controller
10. Payment confirmation displayed to user FIG. 2 shows a system to facilitate purchases on mobile devices by automatic Mobile Network Code, Mobile Country Code and MSISDN detection. In FIG. 2, a system comprises at least one data computing facility (DCF), which is connected to mobile carrier billing, short code and networking infrastructure and a plurality of converters to communicate and interface with a plurality of controllers for various mobile device types and platforms.

In FIG. 2. a method to facilitate cross-platform purchases on mobile devices in a second embodiment by MNC/MCC/MSISDN detection comprises following steps:

1. Transaction initiated by user
2. MNC and MCC values are sent to converter for coverage check
3. MNC and MCC values are checked with DCF coverage database
4. MNC and MCC support is confirmed by DCF to converter
5. MNC and MCC confirmation forwarded to controller
6. Encoded transaction details are sent via SMS text message to short code using messaging component
7. MSISDN value and transaction details are obtained by short code from incoming SMS text message and sent to DCF
8. Transaction details are decoded by DCF and sent to carrier billing system for making a MSISDN based transaction.
9. Transaction billing status is confirmed by carrier billing to DCF Referring to FIG. 3, an illustrative system for facilitating purchase on mobile device 102 is depicted in third embodiment combining and integrating first and second embodiments. The system comprises mobile device component 101 and server component 105 connected to database component 111. Mobile device component 101 and server component 105 are connected to a network. Mobile device component 101 comprises: a device controller 103, configured to interface with operating system of the device, available API's and functions including but not limited to detecting device operating system, it's type and version; a purchase user interface controller 104, configured to interface with input and output components of mobile device including but not limited to display, keyboard, speaker, touchscreen, buttons and indicating lights. Server component 105 comprises user interface converter 106, at least one platform native interface controller, for example platform native interface controllers 107, 108, 109 and a universal user interface controller 110.

Figure 3:
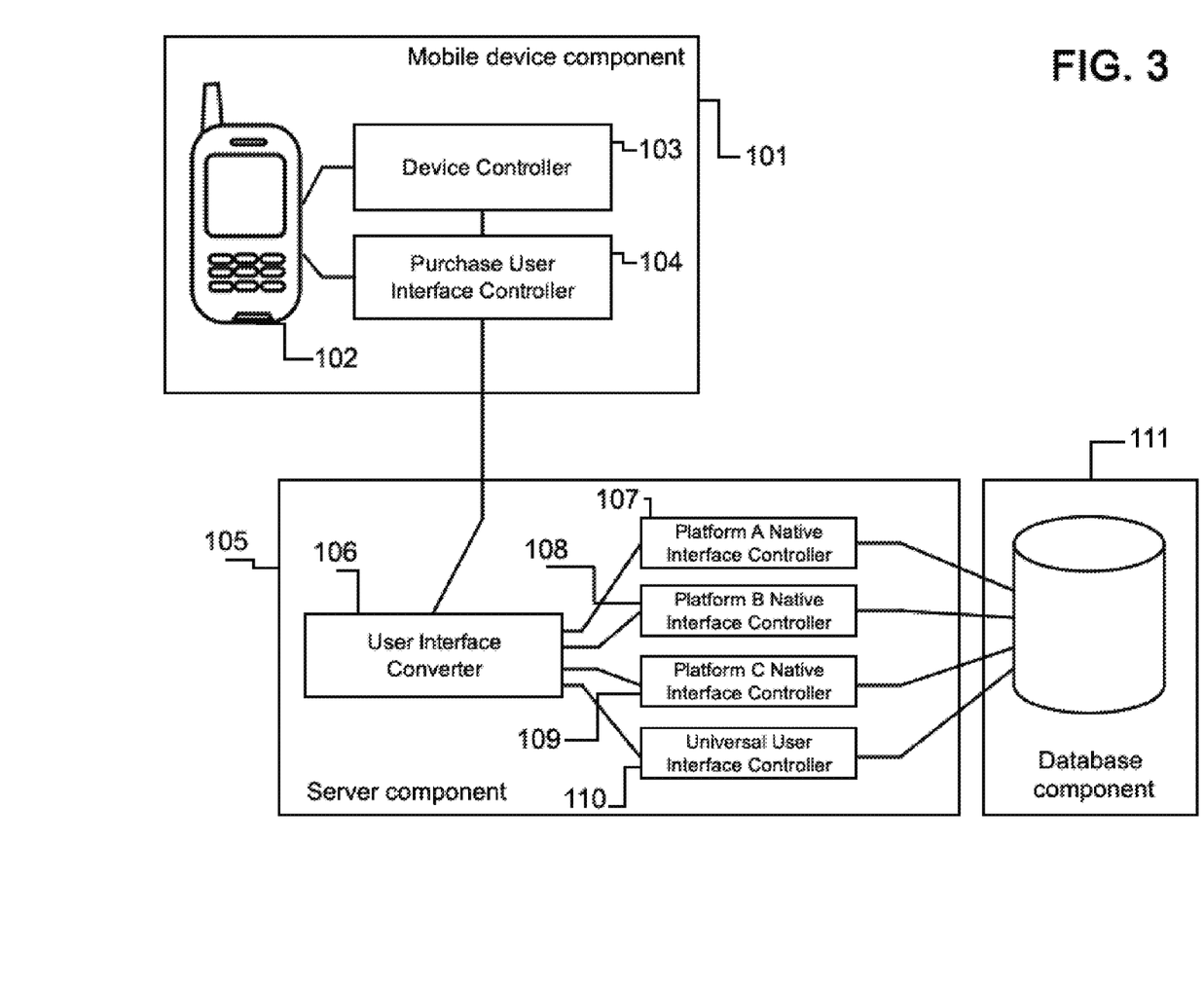
FIG. 3 depicts an illustrative system for facilitating purchases on mobile devices via cross-platform native user interface and/or Mobile Network Code, Mobile Country Code and MSISDN detection.

After the purchase is initiated by the user, respective process is created in purchase user interface controller 104 and device and operating system information is requested from device controller 103. In response to receiving the request, device controller 103 communicates with mobile device core platform 102 and device controller 103 obtains: device information including name, manufacturer, model number, type, screen size; operating system including name, version, manufacturer. This obtained information is required for identifying the device and supporting appropriate user interface for purchase. Respective data is sent to purchase user interface controller 104.

Figure 6:
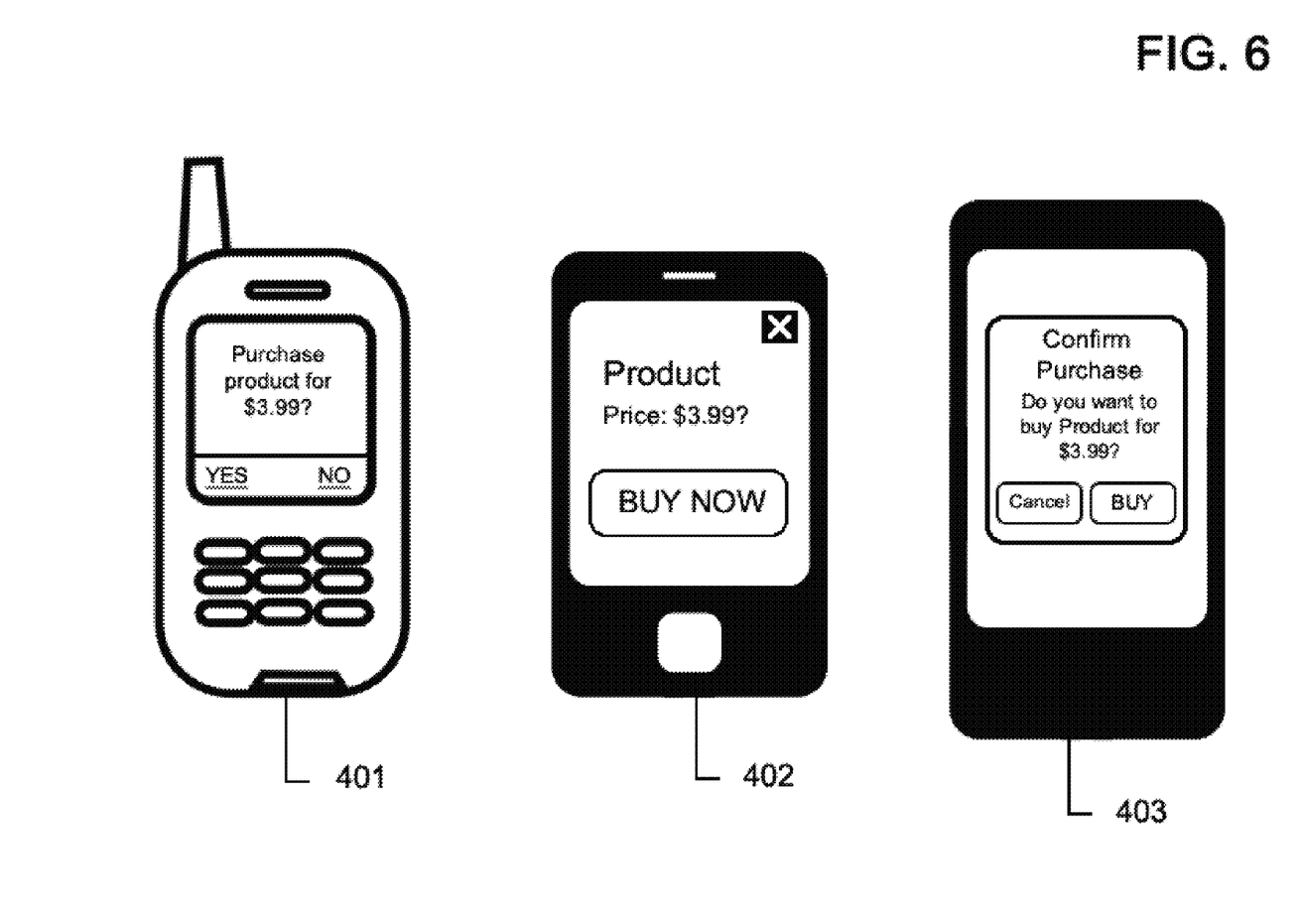
FIG. 6 depicts samples of native and universal user interface for purchase on different mobile platform and operating system.
Figure 7:
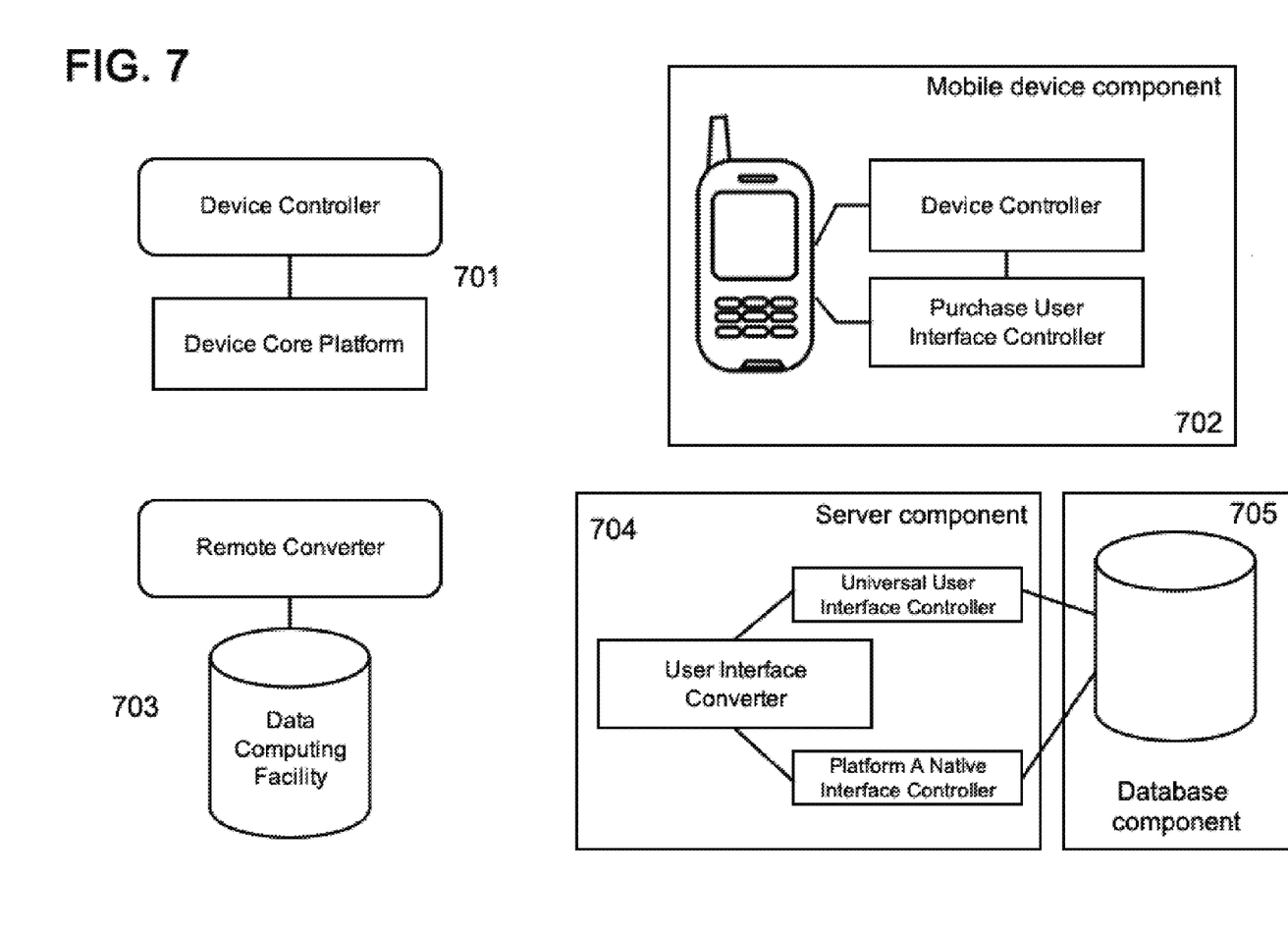
FIG. 7 depicts the third embodiment combining and integrating first and second embodiments.

Purchase user interface controller 104 sends device and operating system information via network to user interface converter 106 of server component 105. After obtaining device and operating system information and comparing with the list of supported platforms and operating systems, user interface converter 106 connects to respective platform native interface controller 107, 108, 109, that matches the platform of mobile device. FIG. 3. depicts 3 sample platform native interface controllers, which are purely illustrative and the amount and type of actual controllers varies in order to match all mobile platforms and operating systems. Platform native interface controller 107, 108, 109 connects to database component 111 and obtains respective native user interface data including but not limited to graphical and textual combination of elements, that is common for respective platform and operating system. FIG. 6. depicts samples of such elements for native and universal user interfaces. Native user interface data is sent to user interface converter 106 and converted to common format in order to be forwarded to purchase user interface controller 104 on mobile device.

In case of the platform or operating system is not detected by device controller 103 or not supported by any of the existing native interface controllers 107, 108, 109 the user interface converter 106 shall request universal user interface data from universal user interface controller 110. Respective universal user interface data and elements are obtained from database component 111 and sent back to user interface converter 106 in same way as with native user interface data. Methods and control procedures conducted within the process of requesting the user interface of FIG. 3 are detailed in FIG. 4.

Figure 4:
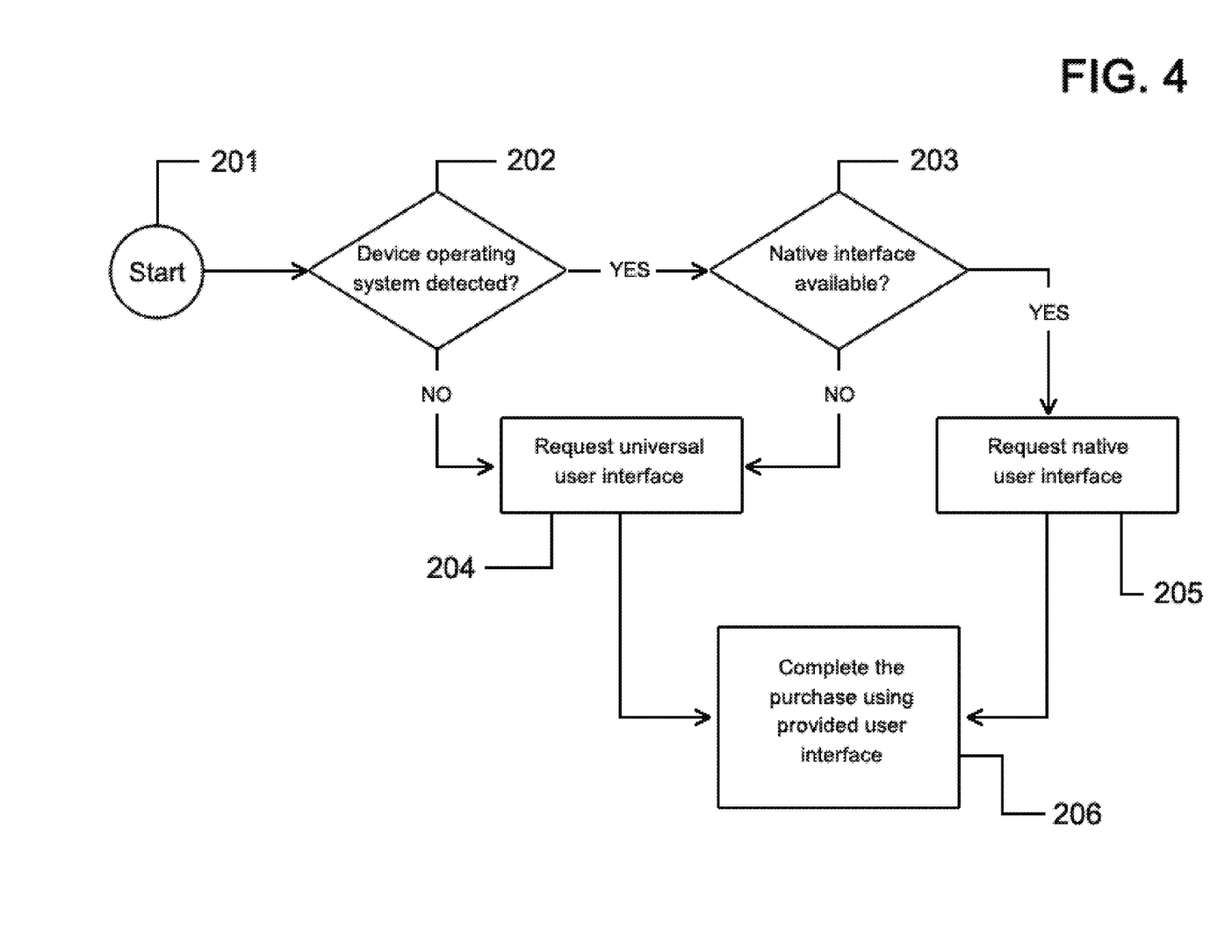
FIG. 4 depicts an illustrative method for providing native or universal user interface for purchase on mobile device.

The process is started 201 by purchase user interface controller 104. If device controller 103 does not succeed in identification of device platform and operating system 202, the universal user interface is requested 204 from user interface converter 106 and universal user interface controller 110. If identification 202 is completed successfully, the decision of selecting an appropriate user interface is passed to user interface converter 106, user interface converter 106 compares device platform and operating system with the list of supported native user interfaces 203. In case of a positive match, respective native user interface is requested 205 from appropriate platform user interface controller 107, 108, 109. In case a matching native user interface is not found, a universal user interface is requested 204 from universal interface controller 110. Resulting user interface is forwarded to mobile device and is used for completing the purchase 206.

After obtaining the user interface data from user interface converter 106 by purchase user interface controller 104 of mobile device as depicted on FIG. 3 and FIG. 4, it's is exposed to the user through visual display of the device 102. FIG. 6. depicts illustrative samples for native and universal user interfaces.

In order to further facilitate the process of purchase on mobile device for the user, purchase user interface controller 104 may obtain additional information from device controller 103.

Figure 5:
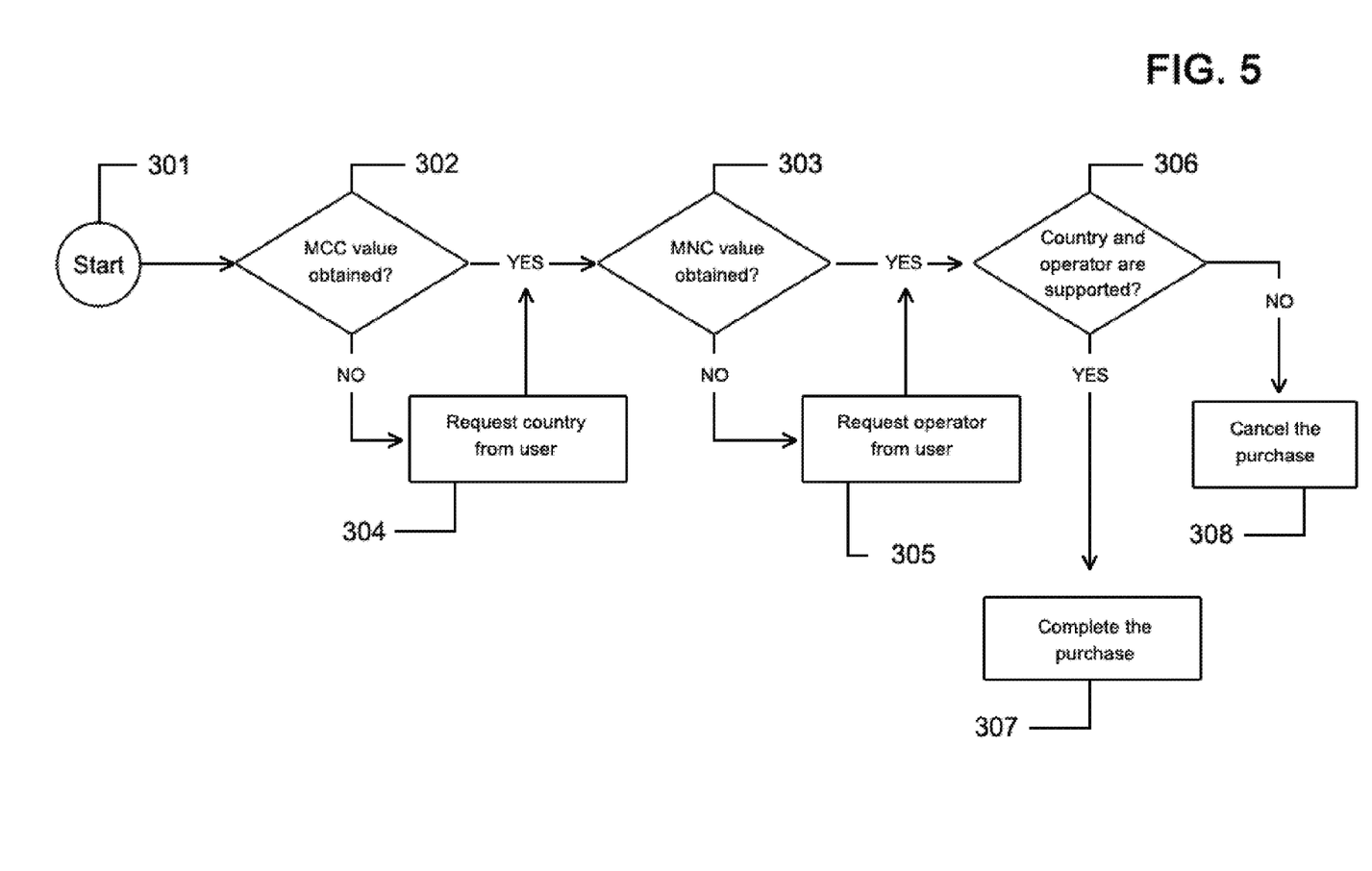
FIG. 5 depicts an illustrative method for obtaining Mobile Country Code and Mobile Network Code values by the device controller for facilitating purchases on mobile devices.

The methods and procedures of obtaining additional information by purchase user interface controller 103 are depicted on FIG. 5. The process is started 301 after obtaining user interface data from 206 from user interface converter 106. If MCC value can not be obtained 302 from device controller 103, user is asked to select his country from a list 304. On next step user is asked to provide his network operator 305 in case MNC value was not obtained 303. Once both country and carrier information is obtained, it is compared with the list of supported countries and carriers 306. In case user's country or carrier is not supported for completing the purchase, it is cancelled 308. Otherwise user is able to continue with the process of completing the purchase 307.

In the illustrative embodiments 401, 402 and 403 of FIG. 6 a sample of purchase user interface on mobile device are depicted. Native and universal user interfaces for mobile devices can vary by several components including but not limited to size, color and style of fonts, interface elements like buttons, checkboxes and input fields, descriptive texts, input methods like keyboards, touchscreens and buttons, their position, background, size, visual style and animation effects. All of the above form a native interface experience, unique for each platform and mobile device operating system.

Referring to FIG. 1, FIG. 2 and FIG. 3, FIG. 7 depicts the third embodiment combining and integrating first and second embodiments of the present invention. Mobile device component 702 is a further development of device controller, connected to device core platform 701 and used for interfacing with mobile device input and output components. Server 704 and database components 705 are the further development of data computing facility and remote converters 703 with the purpose of maintaining and sending native user interface data to phone component.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

The invention claimed is:

1. A method to facilitate cross-platform purchases on mobile devices, wherein the purchases are facilitated through mobile communications on the mobile devices by Mobile Network Code (MNC)/Mobile Country Code (MCC)/Mobile Subscriber Integrated Services Digital Network Number (MSISDN) detection, the method comprising initiating a transaction by a user;

sending MNC and MCC values to a converter for a coverage check;

checking the MNC and MCC values with a Data Computing Facility (DCF) coverage database;

confirming MNC and MCC support by the DCF to the converter;

forwarding a MNC and MCC confirmation to a controller;

sending encoded transaction details via SMS text message to short code using a messaging component;

obtaining a MSISDN value and transaction details by short code from an incoming SMS text message and sending the MSISDN value and transaction details to the DCF;

decoding the transaction details by the DCF and sending the transaction details to a carrier billing system for making a MSISDN based transaction;

confirming transaction billing status by carrier billing to the DCF;

requesting mobile device information and operating system information from a device controller;

sending the mobile device information and operating system information via a network from the purchase user interface controller to a user interface converter of a server component;

connecting the platform native interface controller to a database component;

requesting a universal user interface from a universal user interface controller if a platform or operating system is not detected by the device controller or not supported by any existing native interface controllers;

obtaining the respective universal user interface data and elements from the database component and sending the universal user interface data and elements to the user interface converter; and requesting the universal user interface from the user interface converter and checking if a native user interface is available for respective platform and operating system.

2. A method to facilitate cross-platform purchases on mobile devices, wherein the purchases are facilitated through mobile communications on the mobile devices by allowing a user to interact with a cross-platform native user interface and/or by Mobile Network Code (MNC)/Mobile Country Code (MCC)/Mobile Subscriber Integrated Services Digital Network Number (MSISDN) detection, the method comprising:

initiating a purchase by the user;
    creating a respective process in a purchase user interface controller;
    requesting mobile device information and operating system information from a device controller;
    in response to receiving the request, communicating the device controller with a platform of the mobile device;
    obtaining the mobile device information;
    identifying the mobile device and supporting an appropriate user interface for the purchase;
    sending the respective data to the purchase user interface controller;
    sending the mobile device information and operating system information via a network from the purchase user interface controller to a user interface converter of a server component;
    obtaining the mobile device and operating system information;
    comparing the mobile device information and the operating system information with a list of supported platforms and operating systems,
    connecting the user interface converter to a respective platform native interface controller;
    connecting the platform native interface controller to database component;
    obtaining respective native user interface data;
    sending the native user interface data to the user interface converter;
    converting the native user interface data to a common format;
    forwarding the purchase user interface controller on the mobile device;
    requesting a universal user interface from a universal user interface controller if a platform or operating system is not detected by the device controller or not supported by any existing native interface controllers;
    obtaining the respective universal user interface data and elements from the database component and sending the universal user interface data and elements to the user interface converter; and
    requesting the universal user interface from the user interface converter and checking if a native user interface is available for respective platform and operating system.

3. The method of claim 2, wherein obtaining the user interface comprises:

starting the process with the purchase user interface controller;
    identifying a platform and operating system of the mobile device;
    selecting the appropriate user interface with the user interface converter;
    comparing the mobile device platform and operating system with a list of supported native user interfaces;
    exposing obtained user interface data from the user interface converter to the user through a display of the mobile device;
    obtaining additional information from the device controller to further facilitate the process of purchase on the mobile device for the user; and
    forwarding a resulting user interface to the mobile device and completing the purchase.

4. The method of claim 3, further comprising, in case of a positive match, requesting respective native user interface from an appropriate platform native interface controller.

5. The method of claim 3, further comprising, in case a matching native user interface is not found, requesting a universal user interface from a universal interface controller.

6. The method of claim 2, wherein obtaining additional information by the purchase user interface controller comprises:

obtaining user interface data from the user interface converter;
    obtaining an MCC value from the device controller or asking a user to select a country from a list and provide a network operator;
    comparing the obtained country and network operator with a list of supported countries and network operators; and
    completing the purchase.

* * * * *